United States Patent [19]

Hurlburt

[11] Patent Number: 4,587,890
[45] Date of Patent: May 13, 1986

[54] AIR FILTRATION SYSTEM FOR HARVESTER OPERATOR CAB

[75] Inventor: Joseph C. Hurlburt, Lancaster, Pa.

[73] Assignee: Sperry Corporation, New Holland, Pa.

[21] Appl. No.: 723,424

[22] Filed: Apr. 15, 1985

[51] Int. Cl.[4] .............................................. B60H 3/06
[52] U.S. Cl. .................................. 98/2.11; 55/385 B; 55/429; 55/481
[58] Field of Search ...................... 55/385 B, 429, 490, 55/481, 493, 501, 502, 504; 98/2.11, 2.14, 2.16

[56] References Cited

U.S. PATENT DOCUMENTS

| | | | |
|---|---|---|---|
| 3,993,464 | 11/1976 | Pelabon | 55/481 X |
| 4,365,541 | 12/1982 | Margues et al. | 98/2.11 |
| 4,503,749 | 3/1985 | Kuhn et al. | 98/2.11 |

FOREIGN PATENT DOCUMENTS 1176907 10/1984 Canada ................................. 98/2.11

Primary Examiner—Harold Joyce
Attorney, Agent, or Firm—Larry W. Miller; Frank A. Seemar; Darrell F. Marquette

[57] ABSTRACT

An air filtration system for the operator's cab on a self-propelled crop harvesting machine is disclosed wherein the service door for access to the filter cartridge is positioned above the access door into the cab enclosure. Since the open position of the service door interferes with the opening of the cab access door, the filter cartridge cannot be changed unless the cab door is closed. A movable latch engagement member is engageable with lift members affixed to the service door to lift the latch engagement member out of an engageable position with the door latch to prevent the service door from being latched unless a filter cartridge is positioned within the filtration chamber. The filter cartridge restricts the movement of the latch engagement member to permit engagement thereof with the door latch. The resultant structure provides an air filtration system that requires a filter cartridge within the filtration chamber before the service door can be latched.

15 Claims, 5 Drawing Figures

4,587,890

AIR FILTRATION SYSTEM FOR HARVESTER OPERATOR CAB

BACKGROUND OF THE INVENTION

The present invention relates generally to operator's cabs mounted on self-propelled crop harvesting machines, such as combines, and, more particularly, to an improved air filtration system that requires the use of a filter cartridge within the filtration chamber to enable the service door to be latched.

Modern self-propelled crop harvesting machines are generally equipped with an enclosed operator's cab in which the operator is seated to control the harvesting operation of the machine. Such operator's cabs are generally provided with environmental controls, such as air conditioning and sound absorbing materials, to improve the quality of work environment for the operator. Operator cabs are generally mounted at an elevated position on the crop harvesting machine to afford the operator a field of view of the harvesting operation relative to the gathering of crop material from the field in which he is operating. To permit this field of view, the cab enclosure is provided with a number of transparent panels, normally glass, supported from vertical posts extending between the floor member and the roof member of the cab. To permit access to the cab, the cab enclosure is provided with an access door pivotally mounted to one of the support posts for movement between closed and opened positions.

Since the cab enclosures are generally sealed to maintain environmental conditions within the cab, it is necessary to provide a system for the inlet of fresh air into the enclosure. Typically, such systems provide an air filtration system to filter dirt and debris from the inlet air and, thereby, keep the interior of the cab enclosure as clean as possible. It would be desirable to provide an inlet air filtration system which would be easy and convenient to service from outside the cab enclosure, that would require the cab door to be closed during service operations, that would provide a visual indication when the filter cartridge is not installed, and that would not require the roof of the operator's cab to be lifted to affect service operations.

SUMMARY OF THE INVENTION

It is an object of this invention to overcome the aforementioned disadvantages of the prior art by providing an air filtration system having a service door that interferes with the operation of the cab door unless the service door is closed.

It is another object of this invention to provide an air filtration system in which the service door to the filtration chamber cannot be latched in a closed position unless a filter cartridge is inserted in the filtration chamber.

It is a feature of this invention that a latch engagement member is provided that is movable within the filtration chamber when a filter cartridge is not present to prevent engagement thereof with the door latch.

It is an advantage of this invention that the service door cannot be latched in a closed position unless a filter cartridge is inserted within the filtration chamber to provide a visual indication that the filter cartridge is not installed.

It is another feature of this invention that the access door into the cab enclosure cannot be opened without impacting the filtration system service door during servicing of the air filtration system because of an interference between the opened service door and the opening of the cab access door.

It is another advantage of this invention that servicing of the air filtration system requires the cab access door to be closed to prevent the introduction of extraneous dirt and debris into the cab enclosure.

It is still another advantage of this invention that the air filtration system is easy and convenient for service from outside the cab without requiring the cab roof to be lifted.

It is a further advantage of this invention that the risk of introduction of non-filtered air into the cab enclosure during the operation of the harvester due to a lack of a filter cartridge within the air filtration system is minimized.

It is still another feature of this invention that the latch engagement member includes a spring member that is deformable to absorb lifting forces applied to the latch engagement member when the filter cartridge is present within the filtration chamber.

It is still another object of this invention to provide a means for lifting the latch engagement member when the service door is moved into the closed position.

It is yet another feature of this invention that lift members affixed to the service door engage the latch engagement member when the service door is moved into the closed position.

It is a further object of this invention to provide an air filtration system for the operator's cab on a self-propelled crop harvesting machine which is durable in construction, inexpensive of manufacture, carefree of maintenance, facile in assemblage and simple and effective in use.

These and other objects, features, and advantages are accomplished according to the instant invention by providing an air filtration system for the operator's cab on a self-propelled crop harvesting machine wherein the service door for access to the filter cartridge is positioned above the access door into the cab enclosure. Since the open position of the service door interferes with the opening of the cab access door, the filter cartridge cannot be changed unless the cab door is closed. A movable latch engagement member is engageable with lift members affixed to the service door to lift the latch engagement member out of an engageable position with the door latch to prevent the service door from being latched unless a filter cartridge is positioned within the filtration chamber. The filter cartridge restricts the movement of the latch engagement member to permit engagement thereof with the door latch. The resultant structure provides an air filtration system that requires a filter cartridge within the filtration chamber before the service door can be latched.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
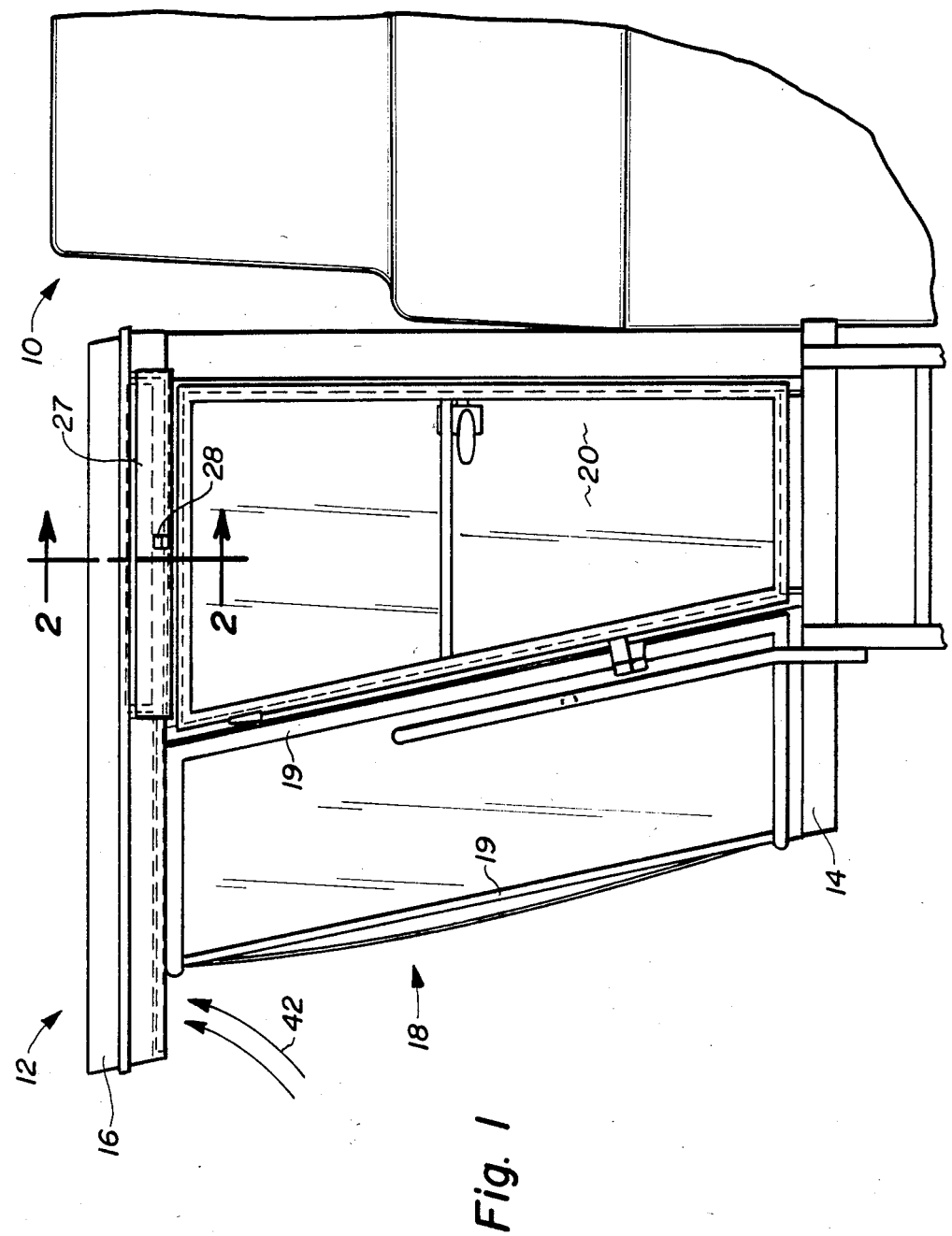
FIG. 1 is a side elevational view of an operator's cab for a self-propelled crop harvesting machine incorporating the principles of the instant invention, the crop harvesting machine being fragmentarily shown.

Referring now to the drawings and, particularly, to FIG. 1, a side elevational view of the operator's cab mounted on a self-propelled crop harvesting machine, commonly referred to as a combine, can be seen. Any left and right references are used as a matter of convenience and are determined by standing at the rear of the machine, facing the forward end, the direction of travel. The self-propelled crop harvesting machine 10 is fragmentarily shown and represents a conventional combine; however, one skilled in the art will readily realize that the principles of the instant invention will not be limited to the type of harvesting machine on which the operator's cab is mounted.

As best seen in FIG. 1, the operator's cab 12 includes a floor member 14, a roof member 16 vertically spaced above the floor member 16 and an enclosure 18 extending around and encompassing an operator's station (not shown) located in the interior of the cab 12. Supporting the roof member 16 above the floor member 14 and at least partially supporting the enclosure 18, the operator cab's 12 is also provided with a plurality of support posts 19. To gain access to the operator's station in the interior of the cab 12, the left side of the enclosure 18 is provided with an access door 20 pivotally connected to a support post 19 for movement between opened and closed positions.

Figure 2:
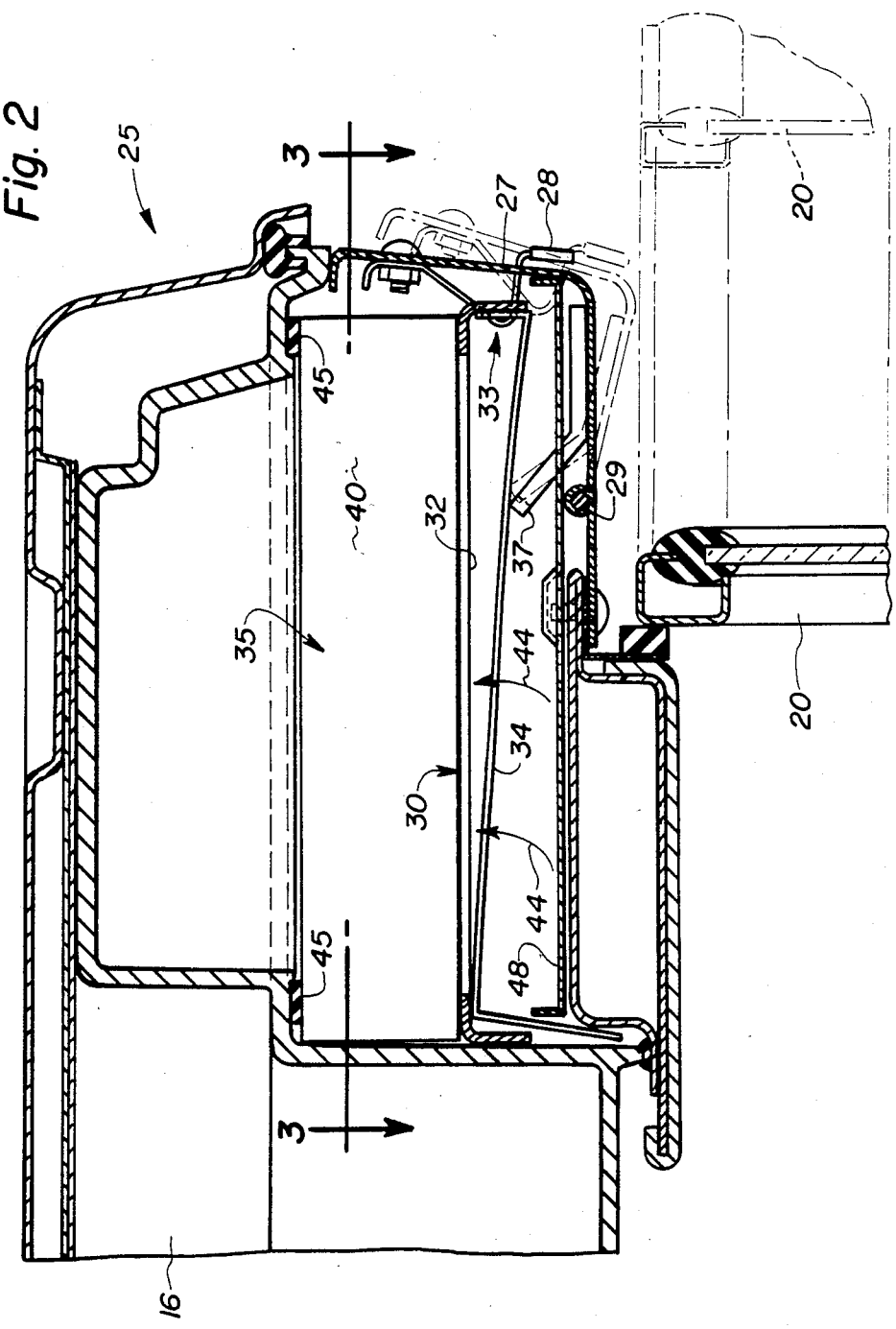
FIG. 2 is a partial cross-sectional view taken along lines 2—2 through the roof member of the operator's cab to show the air filtration system, the pivotal movements of the service door and the cab access door being shown in phantom.
Figure 3:
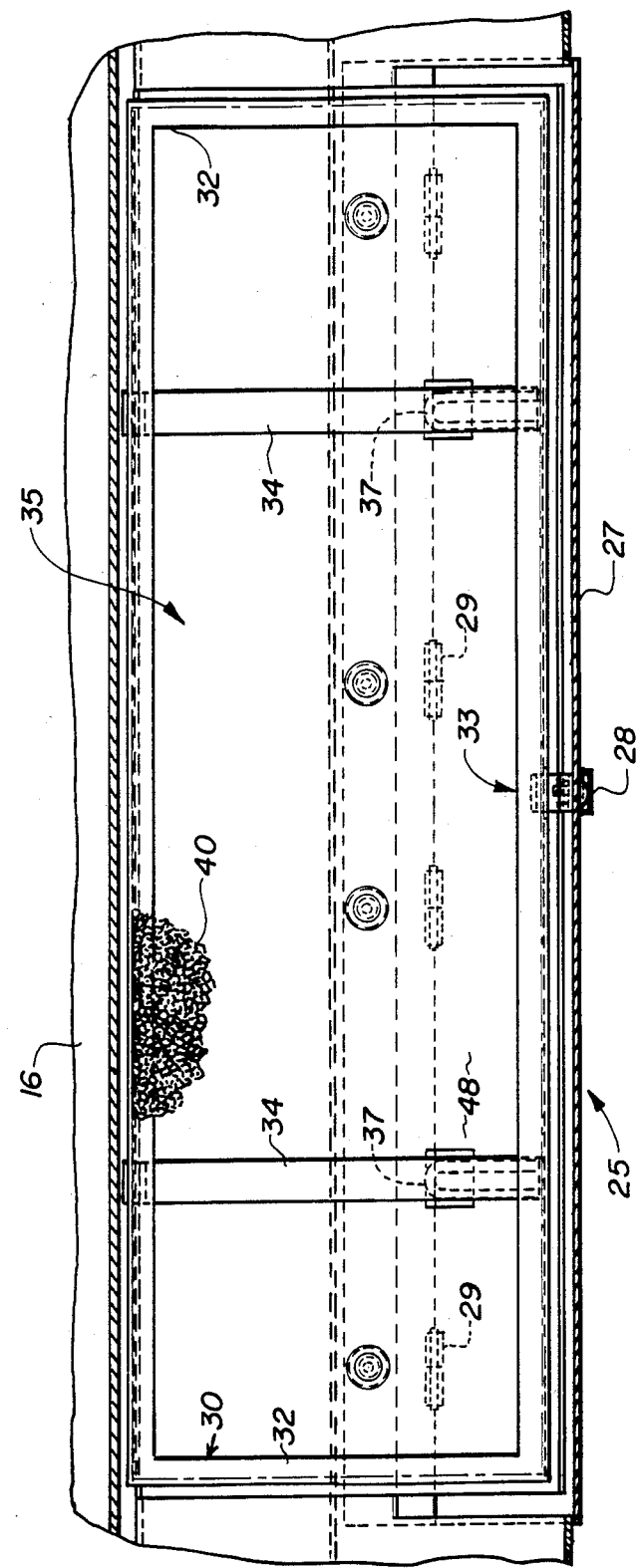
FIG. 3 is a partial cross-sectional view taken along lines 3—3 of FIG. 2 through the filter cartridge to show the latch engagement member.
Figure 4:
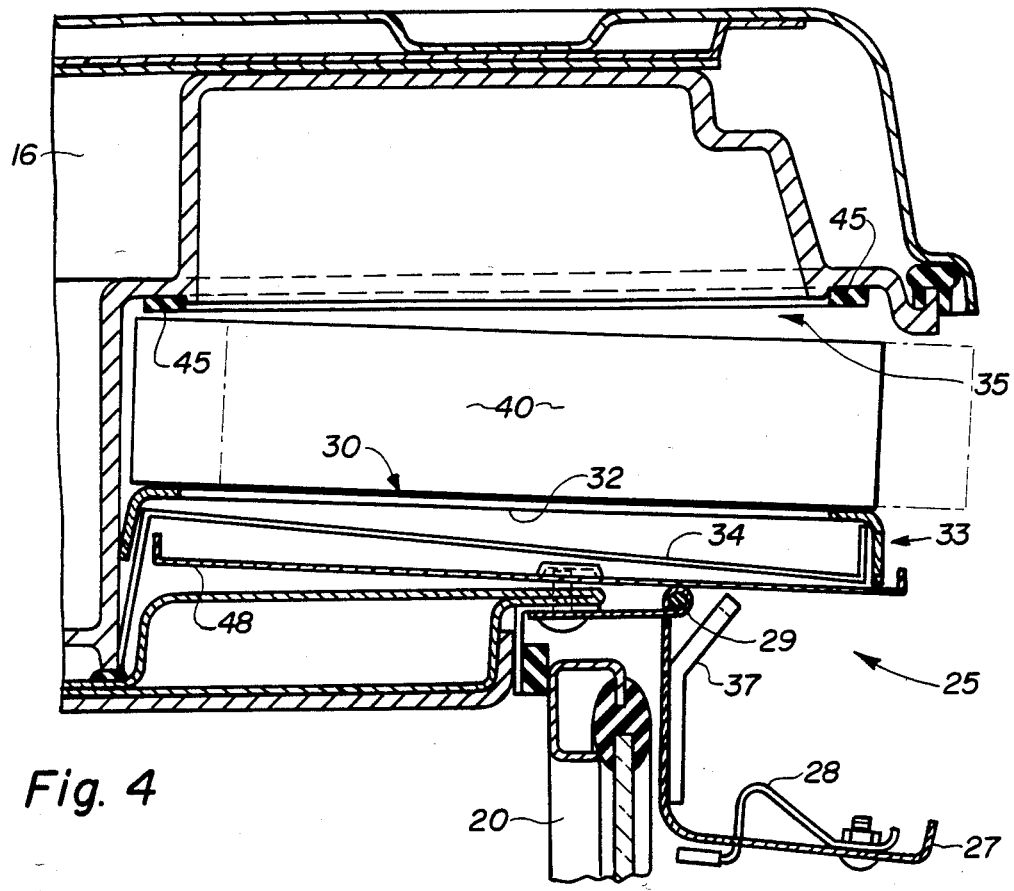
FIG. 4 is a partial cross-sectional view corresponding to the view seen in FIG. 2 with the service door being open to permit servicing of the air filtration system, the movement of the removable filter cartridge being shown in phantom.
Figure 5:
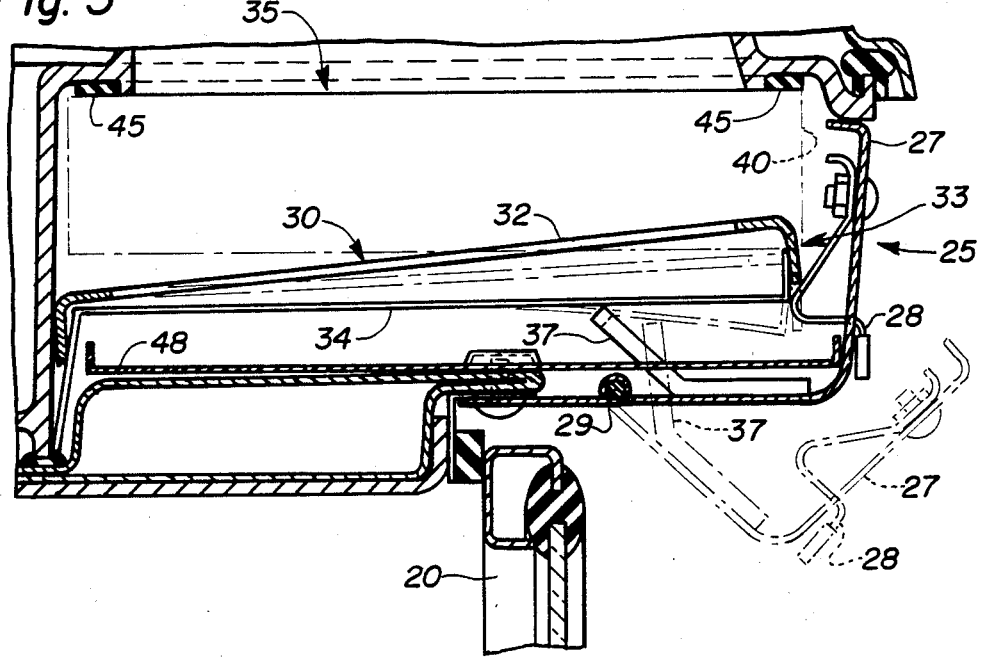
FIG. 5 is a partial cross-sectional view corresponding to the view of FIG. 4 showing the operation of the lift members to move the latch engagement member out of an engageable position with the service door latch, the corresponding positions of the latch engagement member and filter cartridge being shown in phantom when the filter cartridge is inserted into the filtration chamber.

Referring now to FIGS. 1, 2 and 3, the structural details of the air filtration system 25 can best be seen. The service door 27 is pivotally connected to the roof member 16 by a hinge axis 29. The service door 27 is positioned immediately above the access door 20 into the cab 12. As best seen in FIGS. 2, 4 and 5, the opening of the service door 27 positions the service door 27 within an interferring position with the opening of the access door 20. As a result, the servicing of the air filtration system 25 through the service door 27 requires a closing of the access door 20, minimizing the entry of dirt into the cab 12 during the servicing operation.

Referring now to FIGS. 2-5, it can be seen that the service door 27 is provided with a spring latch 28 that is engageable with a latch engagement member 30 positioned within the interior of the filtration chamber 35. The latch engagement member 30 is comprised of a frame like filter support member 32 and spring members 34 positioned below the filter support member 32 and optionally connectable thereto with fasteners (not shown). The filter support member 32 is provided with an opening 33 extending therethrough and aligned to receive the latch member 28 therewithin. The engagement between the latch member 28 and the opening 33 in the filter support member 32 retains the service door 27 in its closed position as seen in FIG. 2.

The service door 27 is provided with lift members 37 positioned for engagement with the spring members 34 when the service door 27 is moved into the closed position. As best depicted in FIG. 5, the lift members 37 engage the spring members 34 and lift the latch engagement member 30 upwardly into the filtration chamber 35 when a filter cartridge 40 is not present within the filtration chamber 35. As a result, the opening 33 in the filter support member 32 is lifted out of an engageable position with the latch member 28 and, thereby, the service door 27 cannot be latched into the closed position. The installation of a filter cartridge 40 into the filtration chamber 35 restricts the upward movement of the latch engagement member 30 within the filtration chamber 35 and forces the filter support member 32 to remain in a position in which the opening 33 can receive the latch member 28. The upward forces exerted by the lift members 37 are absorbed and stored through a deformation of the spring members 34, which in turn urge the filter cartridge upwardly against the seal 45.

Referring now to all the figures, the operation of the air filtration system can be seen. A means for the inlet of air from outside the cab enclosure 18 is provided within the roof member 16 as indicated by the arrows 42 in FIG. 1. The movement of the air rearwardly through the roof member 16 passes under and up through the filter cartridge 40 as indicated by the air flow arrows 44 in FIG. 2. The seal 45 bridges between the top of the filter cartridge 40 and the top of the filtration chamber 35 to require the flow of air to pass through the filter cartridge 40 before being introduced into the interior of the enclosure 18. One skilled in the art will readily realize that the flow of air can be induced by a fan with the flow of air passing through temperature regulating coils and enclosure outlets into the cab 12.

Dirt or other extraneous debris filtered by the filter cartridge 40 can be collected on the bottom of the filter cartridge 40 and on a pan 48 below the filter 40. A servicing of the air filtration system 25 requires a disengagement of the latch member 28 from the opening 33 in the filter support member 32 to permit the service door 27 to be opened. The upward spring forces exerted by the spring members 34, as induced by the lift members 37, are relaxed to allow the filter cartridge 40 to be slid out through the opening created by the opened service door 27. The latch engagement member 30 and dust pan 48 can be lifted out to facilitate a cleaning of the filtration chamber 35. When the components are reassembled within the filtration chamber 35, the service door 27 cannot be latched into its closed position unless a filter cartridge 40 is also inserted within the chamber 35. Since the service door 27 cannot be latched the access door 20 of the enclosure 18 cannot be opened to gain entrance into the cab 12 without impacting the service door 27.

It will be understood that changes in the details, materials, steps and arrangement of parts which have been described and illustrated to explain the nature of the invention, will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In an operator's cab for a crop harvesting machine having a floor member supporting an operator's station; a roof member vertically spaced above said floor member; an enclosure positioned around the periphery of said floor and roof members and extending therebetween to enclose said operator's station, said enclosure including support posts for supporting said roof member above said floor member, said enclosure also including an access door pivotally mounted to one of said support posts for movement between a closed position and an opened position to permit access to and from said operator's station; air inlet means incorporated into said roof member to permit the introduction of air within said enclosure to said operator's station when said access door is in said closed position; and air filtration means supported by said roof member in operative engagement with said air inlet means to filter air entering said enclosure to said operator's station through said air inlet means, said air filtration means including a removable filter cartridge, an improved air filtration means comprising:

a service door hingedly supported by said roof member above said access door, said service door including a latch member;

a latch engagement member engageable with said filter cartridge and said latch member, said latch engagement member being movable when not engaged by said filter cartridge; and lift means associated with said service door and positionably engageable with said latch engagement member when said service door is moved into a closed position to move said latch engagement member out of an engageable position with said latch member when said filter cartridge is not engaged with said latch engagement member.

2. The operator's cab of claim 1 wherein said air filtration means includes a chamber in which said filter cartridge is positionable for filtration engagement with said latch engagement member, said latch engagement member being movable within said filtration chamber.

3. The operator's cab of claim 2 wherein said filter cartridge is operable to restrain the movement of said latch engagement member within said chamber to permit engagement thereof by said latch member.

4. The operator's cab of claim 3 wherein said latch engagement member includes a filter support member having an opening therein for releasably receiving said latch member to retain said service door in said closed position and a spring member connected to said filter support member and positioned between said filter support member and said lift means for operative engagement with said lift means.

5. The operator's cab of claim 4 wherein said spring member transfers lifting forces exerted by said lift means when said service door is moved to said closed position to said filter support member to lift said filter support member within said chamber and out of an engageable position with said latch member when the movement of said filter support member is not restrained by said filter cartridge.

6. The operator's cab of claim 5 wherein said spring member is deformable to absorb said lifting force of said lift means when said filter cartridge is within said chamber and restraining the movement of said filter support member to keep said opening in a position to receive said latch member.

7. The operator's cab of claim 6 wherein said lift means comprises at least one angled member affixed to said service door for engagement with said spring member when said service door is closed.

8. The operator's cab of claim 6 wherein said service door interferes with the movement of said access door into an opened position when said service door is not in said closed position, requiring said access door to be in a closed position to permit an opening of said service door.

9. The operator's cab of claim 8 wherein said service door is accessible only from outside said enclosure, the opened position of said service door being located externally of said access door.

10. The operator's cab of claim 8 wherein said air filtration means further includes a dirt collection pan positioned below said latch engagement member to collect debris filtered from the air passing through said filter cartridge.

11. An air filtration system for an operator's cab on a crop harvesting machine, said operator's cab having vertically spaced floor and roof members and an enclosure peripherally extending therebetween, said enclosure having an access door pivotally movable between closed and opened positions, comprising:

a service door hingedly supported by said roof member above said access door for movement between a closed position and an opened position, the opened position of said service door interfering with the opening of said access door from the closed position thereof, said service door permitting access to a filtration chamber and being provided with a latch member;

a removable filter cartridge positionable within said filtration chamber;

a latch engagement member positionably movable within said filtration chamber and engageable with said filter cartridge to restrict movement thereof, said latch engagement member also being engageable with said latch member to retain said service door in said closed position; and a lift member affixed to said service door and engageable with said latch engagement member when said service door is in said closed position, said lift member being operable to raise said latch engagement member in said filtration chamber to prevent engagement thereof with said latch member unless the movement of said latch engagement member is restrained by said filter cartridge being positioned within said filtration chamber.

12. The operator's cab of claim 11 wherein said service door is accessible only from outside said enclosure, the opened position of said service door being located externally of said access door.

13. The operator's cab of claim 12 wherein said latch engagement member includes a filter support member having an opening therein for releasably receiving said latch member to retain said service door in said closed position and a spring member connected to said filter support member and positioned between said filter support member and said lift means for operative engagement with said lift means.

14. The operator's cab of claim 13 wherein said spring member is deformable to absorb said lifting force of said lift means when said filter cartridge is within said chamber and restraining the movement of said filter support member to keep said opening in a position to receive said latch member.

15. The operator's cab of claim 14 wherein said service door interferes with the movement of said access door into an opened position when said filter is not in said closed position, requiring said access door to be in a closed position to permit an opening of said service door.

* * * * *